Aug. 19, 1952 — H. E. WALKER — 2,607,810
STORAGE BATTERY PLATE SEPARATOR
Filed March 22, 1950 — 2 SHEETS—SHEET 2
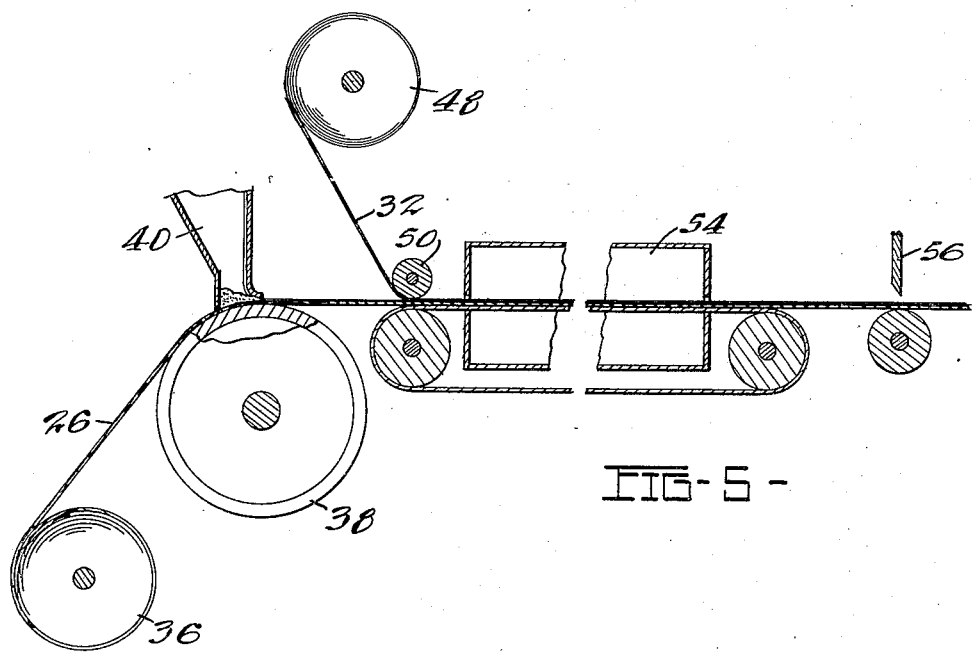
FIG-5-
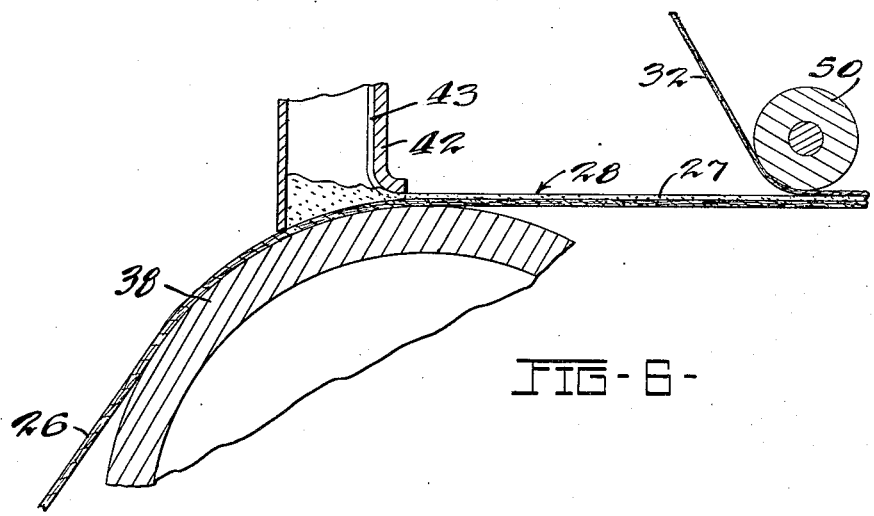
FIG-6-
INVENTOR:
HOWARD E. WALKER.
BY Staehli & Overman
ATTYS.

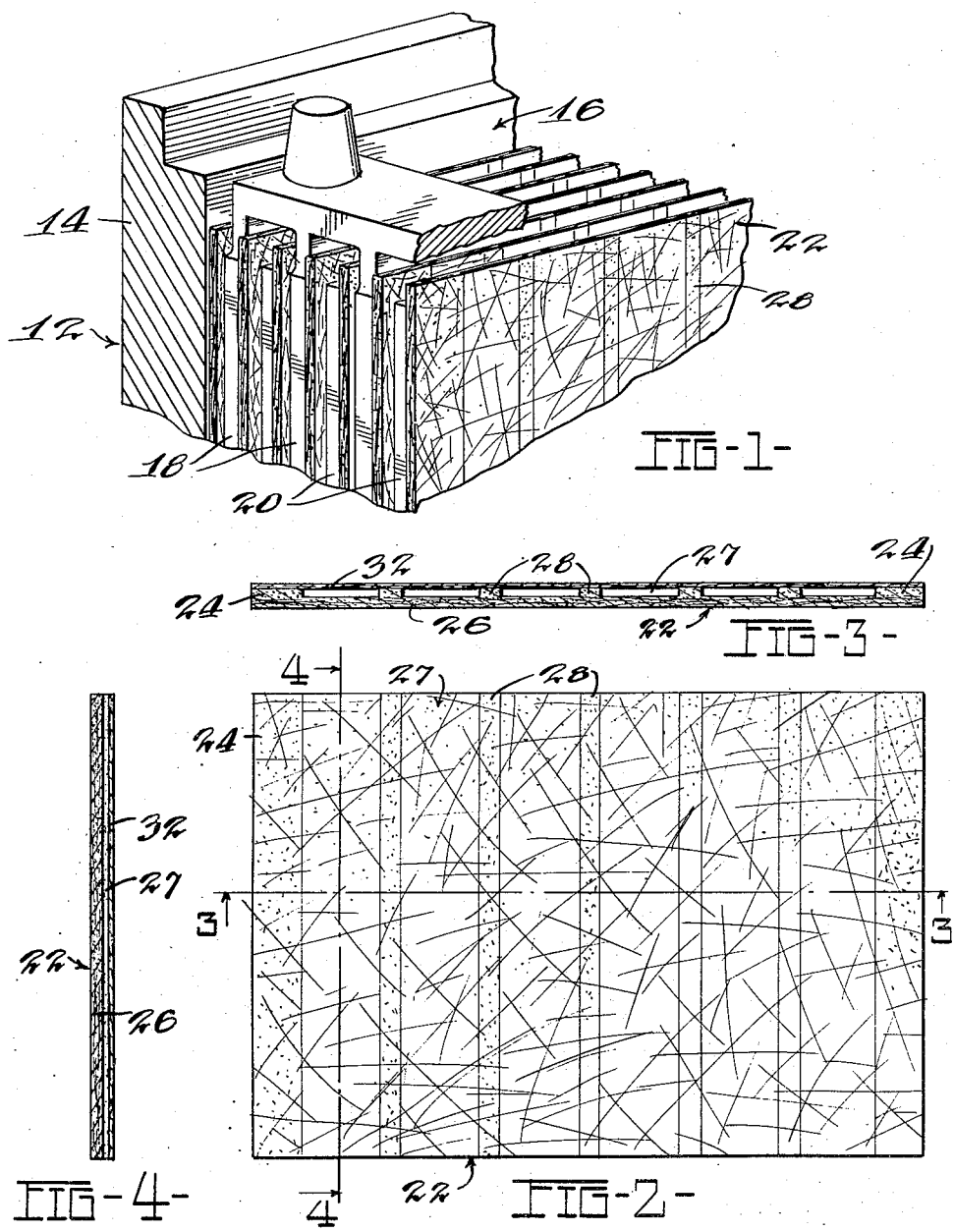

Patented Aug. 19, 1952

2,607,810

UNITED STATES PATENT OFFICE 2,607,810

STORAGE BATTERY PLATE SEPARATOR

Howard E. Walker, Newark, Ohio, assignor to Owens-Corning Fiberglas Corporation, a corporation of Delaware Application March 22, 1950, Serial No. 151,214

4 Claims. (Cl. 136—145)

This invention relates to separators for the plates of storage batteries and particularly to separators of ribbed construction.

Conventional separators, such as those made of wood or rubber, usually are supplied in the form of ribbed plates that are adapted to be interleaved with the plates of the storage battery. The spaces between the ribs form channels which increase the ease of circulation of the electrolyte in the battery and also facilitate the removal of the gas evolved during use of the battery.

In the manufacture of separators from rubber or wood the provision of ribs on one face of the separator is possible simply by cutting grooves in one face of the separator. In the case of separators constructed of fibrous material such, for instance, as fibrous glass, the provision of ribs required that strips of resin, pitch or other material be laid on one face of the glass fiber separator and be adhered in some fashion to the face of the separator. These strips of material blocked the interstices in the separator wherever they covered the separator so that to provide the needed number of ribs it was necessary to sacrifice a large proportion of the porosity of the separator. Thus, while the ribs were provided to increase the ease of circulation of the electrolyte and the removal of gas, they blinded such a large portion of the area of the separator that the circulation of electrolyte through the separator was made much more difficult and the overall characteristics of the separator were not bettered sufficiently to make the separator a generally useful product.

It is an object of the present invention to provide a separator in the form of a fibrous mat so constructed as to prevent the passage of solid particles across the space between the battery plates while at the same time permitting free circulation of the electrolyte and ready escape of gases from the space between the plates.

It is another object of the invention to provide a separator that is sufficiently porous to provide the needed free circulation of electrolyte and that also has sufficient strength and rigidity to be secure in its position in the battery.

It is still another object of the invention to provide a separator having the desired characteristics with respect to electrolyte circulation and escape of gases and that combines with these characteristics sufficient resistance to flexural stresses to permit its easy insertion into spaces between the plates during assembly of the battery.

It is a still further object to provide a battery plate separator constructed of a number of layers each serving a particular function or functions and all held together without an adhesive or cement, which if present would blind the interstices or pores of the separator and thus decrease the ease with which the electrolyte moves through the spaces between the battery plates.

A still further object is to provide a simple and efficient process for the manufacture of battery separators constructed according to the present invention.

In the drawings,

Figure 1 is a perspective view of a portion of one cell of a storage battery showing the separators of the present invention in place between the plates;

Figure 2 is a face view of the separator of the present invention;

Figure 3 is a transverse section taken on the line 3—3 of Figure 2;

Figure 4 is a transverse section of the separator of the present invention taken at right angle to Figure 3 and on the line 4—4 of Figure 2;

Figure 5 is a schematic elevational view of apparatus for carrying out the process of this invention; and Figure 6 is an enlarged detail view of a portion of that apparatus shown in central vertical section.

The battery 12 is of conventional construction and comprises a case 14 having therein a plurality of cells 16. Each of the cells contains a number of positive plates 18 alternating with and in spaced-apart relation with a number of negative plates 20.

A battery separator 22 is disposed in the space between the negative and positive plates. The separator maintains the plates in spaced relation and insulates them from each other. It is so constructed that while serving these functions it also permits the electrolyte in the battery to come into complete contact with the faces of the plates so that the highest possible efficiency of the battery is realized and maintained. The separator of the present invention also allows the electrolyte to move freely in the spaces between the plates and percolate through the separator so that the chemical reaction may take place in the battery at a high rate and provide the capacity desired in the battery.

Referring to Figures 2, 3 and 4, the separator 22 is composed of a layer 24 of highly but minutely porous material hereinafter more completely described and having embedded therein and substantially completely enclosed thereby a web or mat 26 of glass fibers. Preferably the web or mat is impregnated with the material 24 while the material is in a soft flowable or plastic condition so that the material fills all interstices of the mat and forms a continuous body having the fibers of the mat distributed therethrough.

The layer 24 is provided with a plurality of channels 27 in one face thereof which extend to a depth of substantially one-half the thickness of the layer 24 and which are spaced-apart short distances, say about 1/8", to provide lands or ribs 28 therebetween. These lands at the edges of the separator may be four or five times the width of the other ribs to provide greater strength at the edges of the separator. To achieve variations in thickness of the separator to suit different kinds of batteries the ribs 28 may be varied in height while the layer 24 remains the same. In this way the separator thickness may be varied from about .035 to .100 inch without affecting the ohmic resistance of the separator.

The ribbed face of the separator is substantially completely covered with a thin glass fiber mat 32 that is adhered to the ribs 28 by being partially embedded therein and partly impregnated thereby.

The layer 24 is of material that forms a substantially continuous phase through the mat 26 and that is replete with tiny pores so that electrolyte may pass through the layer 24 but the passage of solid particles such as particles of peroxide paste that might become loosened from the battery plates will not pass through the pores. Consequently the building up of these particles into streamers, or what are referred to in the industry as "trees," is effectively prevented by the presence of the layer 24 in the separator.

The separator is preferably disposed in the battery so that the grooves 27 and the ribs 28 are vertical with the ribbed face adjacent the positive plate, and as a result the gas evolved at the positive plate easily passes as bubbles upwardly through the channels. The covering mat 32 acts as a cushioning layer in providing a small amount of compressibility since it is not completely impregnated, and also acts as a cover for the face of the positive plate to hold the active material in place on the plate and retard the loosening of the material and its consequent falling away from the plate.

The covering mat 32 reinforces the mat against flexural stresses tending to bow out the ribbed face while the embedded mat 26 reinforces the mat against oppositely directed flexural stresses. The increase in strength of the mat is of considerable advantage in making it possible to use less lead in the battery plates and more porous or softer plates.

The ribs 28 in the main body portion of the layer 24 are formed of the same highly but minutely porous material and the ribs are formed integral with the main portion of the layer 24 so that there is no line of cleavage or separation between the ribs and the main body portions nor is there a need for a layer of adhesive or cement between the ribs and the main body portion. As a consequence, there is a highly integral separator of unusually good strength but one that is porous throughout the complete thickness of the separator over all portions of the area of the face of the separator. It will be evident that this is of substantial advantage in permitting the freest flow of the electrolyte and the consequent highest possible efficiency of the battery.

The separator of the present invention may be manufactured in any suitable way but is herein illustrated as being made by the process shown schematically in Figure 5 and in detail in Figure 6. Here the glass fiber mat or web 26, which may be of about ten thousandths of an inch in thickness, is taken from a supply of the mat such as a roll 36 and fed over the surface of a drum 38. Mounted above the drum and in closely spaced relation to the surface thereof is a coater 40 which is in the form of a chamber open at the top and bottom and having its wall 42 at the outfeeding end thereof curved into substantial tangential relation with the surface of the drum. This forward wall 42 of the coater 40 is provided with a series of ribs 43 thereon corresponding in number, arrangement and size to the grooves it is desired to provide in the battery separator. The bottom edges of the walls of the coater are spaced from the surface of the roll 38 a distance corresponding substantially to the thickness of the mat 26 so that the mat as it passes over the drum moves beneath the coating device and comes into engagement with coating material therein.

The impregnating material for the layer 24 is fed in plastic condition into the coater 40 to form a deformable mass of the material that will be urged against the forward wall 42 of the coater by movement of the mat 26 past the coater. As the mat passes beneath the forward wall of the coater the plastic impregnating material is pressed into the interstices of the mat by the converging space between the forward wall 42 and the surface of the drum 38 so that the mat is completely impregnated. At the same time the ribs 43 on the forward wall mold the grooves 27 into the plastic material so that the ribbed form of the upper face of the impregnated and coated mat is obtained.

The covering mat 32 is taken from a suitable supply thereof such as the roll 48 and is fed onto the ribbed surface of the separator and urged into contact therewith as by a roll 50. The plastic impregnating and coating material of the layer 24 at the upper face of the ribs 28 adheres to and may partly or fully impregnate the mat 32 along separated bands, so that the mat becomes bonded to the ribbed face of the body of the separator.

The separator structure is then fed through an oven 54 maintained at a temperature slightly above room temperature, for instance about 125° F. to 200° F. or up to 400° F. if desired, to dry or set the impregnating and coating material, and the completed separator is then cut into pieces of the desired size as by a reciprocating knife 56.

The material forming the body 24 may be of any suitable kind capable of being applied in plastic condition and then hardened. It must also be replete with minute pores sufficiently small to prevent the passage therethrough of particles of active material that become dislodged from the battery plates, with the pores present in sufficient number to permit free circulation of the electrolyte. Microporous rubber, for instance of the kind conventionally employed for battery separators, may be employed in the invention and formed into a separator in the manner disclosed herein. In such case the setting or hardening step is the ordinary vulcanizing operation.

It is preferred, however, to employ as the body 24 a material that is largely inorganic and that provides a high degree of porosity of the kind required. The preferred material is a combination of minute, distinct, separate particles or pebbles, some of the particles serving to bind the other particles one to another to create an integral mass. Thus, a structure is obtained in which the particles or minute pebbles make substantially only pin-point contact with each other. Consequently, the area surrounding each point contact is open for the free passage of fluids. As a result, desirable porosity is easily obtained by the present separator and yet there is not a sacrifice in density or the like which make the separator susceptible to "treeing" and "bridging." Nor is there a consequent loss of any of the other previously mentioned desirable properties.

The layer particles may be made of any material which is inert to battery action and capable of reduction to minute particle form. The size of such particles may vary widely depending on the final properties desired. As an example, a satisfactory diameter size may range from 10 to 80 microns, although other sizes may be used.

Materials which can be comminuted to form layer particles of the present invention include siliceous matter comprising silica, such as ordinary, substantially iron-free sand; and silicates, such as aluminum silicate, pyrophyllite, wollastonite, pumice, and substantially iron-free clays. Silica is prefered since it is easily obtained in a finely divided state and is very inert to the chemical action of a battery.

A highly prefered form of silica is diatomaceous earth, the material composed of skeletons of the diatoms and like unicellular alga whose walls are thought to have acquired silicon through chemical double decomposition with siliceous matter present in the same environment.

The particles of diatomaceous earth are each composed of a multiplicity of tiny, petrified skeletons of the diatoms. Consequently, each particle of the diatoms is itself full of open cavities and pores.

As a result, a separator of the present invention utilizing diatomaceous earth and made according to the present invention has excellent porosity since paths of flow are available through as well as around these particles. Yet the openings in the skeletonized diatoms are not sufficiently large to encourage "treeing," "bridging," and the like.

The binder particles which serve to bind the layer particles into an integral mass may comprise elastomers such as butadiene-styrene copolymers (GRS or Buna S), natural rubber, butadiene-isobutylene copolymers, polyisobutylene, organo-silicon elastomers, butadiene- acrylonitrile copolymers, and chloroprene polymer.

The following are examples of suitable impregnating compositions or pastes:

*Example I*

20 parts gelatin (3% solids in water)
15 parts neoprene latex (40% suspension in water)
14 parts diatomaceous earth
0.5 part dibutylphenol sodium disulfonate (wetting agent)

*Example II*

20 parts butadiene-styrene copolymer (40% aqueous suspension)
10 parts Dicalite (diatomaceous earth)

*Example III*

40 parts natural rubber latex (50% emulsion)
10 parts aluminum silicate
20 parts silica (iron-free)
10 parts ammonium alginate (in 20% solution)

*Example IV*

40 parts plasticized polystrene (95,000 MW) (40% aqueous suspension)
20 parts gelatin (4% solids in water)
0.5 part Aerosol OT (wetting agent)
30 parts clay In making the impregnating compositions, the indicated ingredients are merely mixed together preferably with stirring. The mass is then fed to the coater 40 either in batches or in a continuous stream, and applied to the mat 26 in the way previously described.

I claim:

1. A battery plate separator comprising a mat of glass fibers substantially completely impregnated and having its interstices filled with a porous material, a plurality of spaced-apart ribs on a face of said separator projecting outwardly beyond the face of the mat and composed of and integral with the porous material impregnating and filling the interstices of said mat, and an open porous web of interlaced glass fibers substantially coextensive with said mat superposed on the mat and adhered to the outer ends of said ribs.

2. A battery plate separator comprising a mat of glass fibers impregnated and having its interstices filled with a porous material, a plurality of spaced-apart ribs on a face of said separator projecting outwardly beyond the face of the mat and composed of and integral with the porous material impregnating said mat, and an open porous web of interlaced glass fibers substantially coextensive with said impregnated mat superposed on the mat in spaced-apart relation thereto and adhered to the outer ends of said ribs, the porous material making up said ribs penetrating the web of interlaced glass fibers and adhering it to said ribs.

3. A battery plate separator comprising a mat of glass fibers impregnated and having its interstices filled with a porous material composed of diatomaceous earth bonded into a unitary body with a binder in subdivided form, a plurality of spaced-apart ribs on a face of said separator projecting outwardly beyond the face of the mat and composed of and integral with the porous material impregnating said mat, and an open porous web of interlaced glass fibers substantially coextensive with said impregnated mat superposed on the mat and adhered to the outer ends of said ribs.

4. A battery plate separator comprising a mat of glass fibers impregnated and having its interstices filled with a porous material composed of diatomaceous earth bonded into a unitary body with synthetic rubber in subdivided form, a plurality of spaced-apart ribs on a face of said separator projecting outwardly beyond the face of the mat and composed of and integral with the porous material impregnating said mat, and an open porous web of interlaced glass fibers substantially coextensive with said impregnated mat superposed on the mat and adhered to the outer ends of said ribs.

HOWARD E. WALKER.

(References on following page)

REFERENCES CITED

The following references are of record in the file of this patent:

UNITED STATES PATENTS

| Number | Name | Date |
|---|---|---|
| 1,674,594 | Hampton | June 19, 1928 |
| 1,900,307 | Snyder | Mar. 7, 1933 |
| 2,117,371 | Slayter | May 17, 1938 |
| 2,155,016 | Kershaw | Aug. 18, 1939 |
| 2,247,091 | Jumau | June 24, 1941 |
| 2,454,100 | Slayter | Nov. 16, 1948 |
| 2,478,186 | Gerber | Aug. 9, 1949 |

FOREIGN PATENTS

| Number | Country | Date |
|---|---|---|
| 49,385 | France | Dec. 17, 1938 |
| 377,257 | Great Britain | July 15, 1932 |
| 451,628 | Great Britain | Aug. 10, 1936 |
| 537,377 | Great Britain | June 19, 1941 |
| 844,212 | France | Apr. 17, 1939 |